(12) United States Patent
Buendgen et al.

(10) Patent No.: US 12,362,938 B2
(45) Date of Patent: Jul. 15, 2025

(54) ATTESTATION OF A SECURE GUEST

(71) Applicant: INTERNATIONAL BUSINESS MACHINES CORPORATION, Armonk, NY (US)

(72) Inventors: Reinhard Theodor Buendgen, Baden-Wuerttemberg (DE); Jonathan D. Bradbury, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 17/395,053

(22) Filed: Aug. 5, 2021

(65) Prior Publication Data

US 2023/0044731 A1    Feb. 9, 2023

(51) Int. Cl.
*H04L 29/06* (2006.01)
*H04L 9/32* (2006.01)

(52) U.S. Cl.
CPC .................................. *H04L 9/3234* (2013.01)

(58) Field of Classification Search
CPC .................................................... H04L 9/3234
USPC .......................................................... 726/26
See application file for complete search history.

(56) References Cited

U.S. PATENT DOCUMENTS

| | | | |
|---|---|---|---|
| 9,477,486 B2 | 10/2016 | Raj et al. | |
| 10,075,440 B1 | 9/2018 | Arunkumar et al. | |
| 10,338,957 B2 | 7/2019 | Scarlata et al. | |
| 10,341,116 B2 | 7/2019 | Liu et al. | |
| 10,379,894 B1* | 8/2019 | Cruz Oliveira Queiros ................ H04L 63/08 | |
| 10,397,005 B2 | 8/2019 | Brickell | |
| 10,621,350 B2 | 4/2020 | Novak et al. | |
| 10,880,097 B2 | 12/2020 | Scarlata et al. | |
| 10,977,362 B2 | 4/2021 | Yu et al. | |
| 11,164,179 B2* | 11/2021 | Greiche .................. H04L 63/08 | |
| 2008/0046752 A1 | 2/2008 | Berger et al. | |
| 2013/0097392 A1* | 4/2013 | Arges .................. G06F 21/6209 711/147 |

(Continued)

FOREIGN PATENT DOCUMENTS

| CN | 101410848 B | 4/2009 |
|---|---|---|
| CN | 103905205 B | 7/2014 |

(Continued)

OTHER PUBLICATIONS

Yu, "Obtaining the Integrity of Your Virtual Machine in the Cloud", 2011, IEEE, pp. 213-222 (Year: 2011).*

(Continued)

*Primary Examiner* — Taghi T Arani
*Assistant Examiner* — Gregory A Lane
(74) *Attorney, Agent, or Firm* — Edward J. Wixted, III; Blanche E. Schiller, Esq.; Heslin Rothenberg Farley & Mesiti P.C.

(57) ABSTRACT

A trusted execution environment obtains an attestation request. The attestation request includes at least an attestation key. Based on obtaining the attestation request, one or more integrity measurements are computed, and the computing uses at least the attestation key. The one or more integrity measurements are provided to an entity, and the one or more integrity measurements are to be used to verify that a secure guest has been started using a selected secure guest image and selected secure guest metadata.

25 Claims, 12 Drawing Sheets

(56) References Cited

U.S. PATENT DOCUMENTS

| | | | |
|---|---|---|---|
| 2013/0254798 A1* | 9/2013 | Kim | H04N 21/4348 725/32 |
| 2014/0108726 A1 | 4/2014 | Laurich et al. | |
| 2016/0366185 A1 | 12/2016 | Lee et al. | |
| 2018/0004954 A1* | 1/2018 | Liguori | H04L 9/14 |
| 2018/0109538 A1 | 4/2018 | Kumar et al. | |
| 2019/0243950 A1 | 8/2019 | Soriente et al. | |
| 2019/0278911 A1 | 9/2019 | Pappachan et al. | |
| 2019/0311123 A1 | 10/2019 | Lal et al. | |
| 2020/0026857 A1 | 1/2020 | Muller et al. | |
| 2020/0076607 A1 | 3/2020 | Allen | |
| 2020/0082091 A1 | 3/2020 | Areno et al. | |
| 2020/0082097 A1 | 3/2020 | Areno et al. | |
| 2020/0204370 A1* | 6/2020 | Wisniewski | H04L 9/3247 |
| 2020/0285746 A1 | 9/2020 | Buendgen | |
| 2020/0349252 A1 | 11/2020 | Yu et al. | |
| 2021/0011984 A1* | 1/2021 | Renke | G06F 21/79 |
| 2021/0232709 A1 | 7/2021 | Buendgen | |
| 2022/0019698 A1* | 1/2022 | Durham | G06F 21/71 |
| 2022/0114249 A1* | 4/2022 | Grancharov | G06F 21/53 |
| 2022/0138286 A1* | 5/2022 | Zage | H04L 63/0428 726/26 |
| 2022/0222098 A1 | 7/2022 | Srivastava et al. | |
| 2022/0222099 A1* | 7/2022 | Srivastava | G06F 21/53 |
| 2022/0222357 A1 | 7/2022 | Buendgen | |

FOREIGN PATENT DOCUMENTS

| | | | |
|---|---|---|---|
| CN | 103944729 A | 7/2014 | |
| CN | 112784258 A | 5/2021 | |
| EP | 2942729 A1 | 11/2015 | |
| TW | 202036345 A | 10/2020 | |

OTHER PUBLICATIONS

Sev-Snp, "Strengthening VM isolation with integrity protection and more", 2020, White Paper, pp. 3-20 (Year: 2020).*

Notification of Transmittal of the International Search Report and the Written Opinion of the International Searching Authority, PCT/EP2022/071774, Nov. 21, 2022, 13 pages.

Wang, Ziwang et al., TZ-MRAS: A Remote Attestation Scheme for the Mobile Terminal Based o ARM TrustZone, Hindawi Security and Communication Networks, vol. 2020, Article ID 1756130. Sep. 23, 2020, pp. 1-16.

Srivastava, Abhinav et al., "Trusted VM Snapshots in Untrusted Cloud Infrastructures," Jan. 1, 2012, pp. 1-21.

AMD, "AMD Secure Encrypted Virtualization (SEV)", printed Jan. 23, 2023, 5 pages, https://developer.amd.com/sev/.

Intel, "Confidential Computing—the emerging paradigm for protecting data in-use", Sep. 22, 2020, 7 pages, <https://community.intel.com/t5/Blogs/Products-and-Solutions/Security/Confidential-Computing-the-emerging-paradigm-for-protecting-data/post/1335003>.

IBM, "IBM Secure Execution for Linux", printed Jan. 30, 2023, 4 pages, <https://www.ibm.com/downloads/cas/0158MBWG>.

IBM, "z/Architecture—Principles of Operation," IBM Publication No. SA22-7832-12, Thirteenth Edition, Sep. 2019, pp. Jan. 2000.

Mell, Peter and Tim Grance, "The NIST Definition of Cloud Computing," National Institute of Standards and Technology, Information Technology Laboratory, Special Publication 800-145, Sep. 2011, pp. 1-7.

Sardar, Muhammad Usama et al., "Demystifying Attestation in Intel Trust Domain Extensions Via Formal Verification," vol. 9, Jun. 15, 2021, pp. 83067-83079.

Ozga, Wojciech et al., "WELES: Policy-Driven Runtime Integrity Enforcement of Virtual Machines," May 3, 2021, pp. 1-19.

Conti, Mauro et al., "RADIS: Remote Attestation of Distributed IT Services," 6th IEEE International Conference on Software Defined Systems, 2019 (no further date information available), pp. 25-32.

Eckel, Michael et al., "Secure Attestation of Virtualized Environments," IFIP International Federation for Information Processing 2020, 2020 (no further date information available), pp. 203-216.

EP Response to Rule 161, Application No. 22761128.2, dated Aug. 30, 2024, pp. 1-72.

Innovation, Science and Economic Development Canada, "Office Action," Dec. 19, 2024, 6 Pages, CA Application No. 3217422.

Innovation, Science and Economic Development Canada, "Second Office Action," May 26, 2025, 4 Pages, CA Application No. 3217422.

* cited by examiner

|  | NAME | ABBR | CONTENTS | PROTECTION |
|---|---|---|---|---|
|  |  | 310 | 312 | 314 | 316 |
| 302 | REQUEST STRUCTURE TYPE | RHT | ATTESTATION REQUEST | INTEGRITY |
|  | REQUEST STRUCTURE INITIALIZATION VALUE | RHIV | INITIALIZATION VALUE USED FOR AES-GCM ENCRYPTION OF REQUEST STRUCTURE | INTEGRITY |
|  | # OF KEY SLOTS | NKS |  | INTEGRITY |
|  | ATTESTATION FLAGS | AF | BIT MAP DENOTING ENTITIES TO BE ATTESTED | INTEGRITY |
| 318 | CUSTOMER PUBLIC KEY | CPK | CUSTOMER PUBLIC KEY | INTEGRITY |
| 320 | KEY SLOT 1 | kslot1 | RPK WRAPPED FOR HOST 1 | INTEGRITY |
|  | ... |  |  | INTEGRITY |
|  | KEY SLOT n | kslotn | RPK WRAPPED FOR HOST n | INTEGRITY |
| 322 | ATTESTATION KEY | AK | 512 BIT HMAC KEY | ENCRYPTED |
|  | NONCE | NC | OPTIONAL NONCE | ENCRYPTED |
| 324 | REQUEST STRUCTURE TAG | RST | AES-GCM TAG | N/A |

FIG. 3

OBTAIN, BY A TRUSTED EXECUTION ENVIRONMENT, AN ATTESTATION REQUEST—600

THE ATTESTATION REQUEST INCLUDES AT LEAST AN ATTESTATION KEY—602

COMPUTE, BASED ON OBTAINING THE ATTESTATION REQUEST, ONE OR MORE INTEGRITY MEASUREMENTS, THE COMPUTING USING AT LEAST THE ATTESTATION KEY—604

PROVIDE THE ONE OR MORE INTEGRITY MEASUREMENTS TO AN ENTITY—606

THE ONE OR MORE INTEGRITY MEASUREMENTS TO BE USED TO VERIFY THAT A SECURE GUEST HAS BEEN STARTED USING A SELECTED SECURE GUEST IMAGE AND SELECTED SECURE GUEST METADATA—608

THE ATTESTATION REQUEST INCLUDES AN ATTESTATION REQUEST STRUCTURE THAT IS INTEGRITY PROTECTED—610

THE ATTESTATION KEY IS MAINTAINED IN AN ENCRYPTED PORTION OF THE ATTESTATION REQUEST STRUCTURE—612

THE ATTESTATION REQUEST STRUCTURE IS EXCLUSIVELY INTERPRETABLE BY THE TRUSTED EXECUTION ENVIRONMENT—614

VERIFY INTEGRITY PROTECTION OF THE ATTESTATION REQUEST STRUCTURE—615

DECRYPT, BY THE TRUSTED EXECUTION ENVIRONMENT BASED ON SUCCESSFULLY VERIFYING THE INGRITY PROTECTION OF THE ATTESTATION REQUEST STRUCTURE, THE ENCRYPTED PORTION OF THE ATTESTATION REQUEST STRUCTURE TO OBTAIN THE ATTESTATION KEY TO BE USED IN COMPUTING THE ONE OR MORE INTEGRITY MEASUREMENTS—616

THE PROVIDING THE ONE OR MORE INTEGRITY MEASUREMENTS FURTHER INCLUDES PROVIDING SELECT INFORMATION OF THE TRUSTED EXECUTION ENVIRONMENT TO BE USED TO VERIFY THE SECURE GUEST—618

THE SELECT INFORMATION INCLUDING RUNTIME DATA OF THE SECURE GUEST—620

FIG. 6A

THE ONE OR MORE INTEGRITY MEASUREMENTS INCLUDES A COMPUTED VERIFICATION CODE COMPUTED BASED ON AT LEAST AN IMAGE OF THE SECURE GUEST AND ONE OR MORE SECURE GUEST METADATA~630

THE COMPUTED VERIFICATION CODE IS FURTHER COMPUTED BASED ON RUNTIME DATA OF THE SECURE GUEST~632

THE RUNTIME DATA OF THE SECURE GUEST INCLUDES A UNIQUE IDENTIFICATION OF A RUNNING INSTANCE OF THE SECURE GUEST THAT ISSUED THE ATTESTATION REQUEST~634

THE COMPUTED VERIFICATION CODE IS FURTHER COMPUTED BASED ON SPECIFIC DATA OF THE SECURE GUEST~636

THE ATTESTATION REQUEST IS OBTAINED FROM THE SECURE GUEST VIA A NON-INTERCEPTABLE CALL TO THE TRUSTED EXECUTION ENVIRONMENT~638

THE ATTESTATION REQUEST FURTHER INCLUDES SPECIFIC DATA OF THE SECURE GUEST~640

THE SPECIFIC DATA OF THE SECURE GUEST TO BE USED WITH THE ATTESTATION KEY TO COMPUTE THE ONE OR MORE INTEGRITY MEASUREMENTS~642

THE ENTITY IS THE SECURE GUEST AND THE PROVIDING FURTHER INCLUDES PROVIDING TO THE SECURE GUEST RUNTIME DATA OF THE SECURE GUEST~644

THE RUNTIME DATA OF THE SECURE GUEST, THE ONE OR MORE INTEGRITY MEASUREMENTS AND THE SPECIFIC DATA OF THE SECURE GUEST ARE TO BE FURTHER PROVIDED TO A REQUESTING ENTITY TO BE USED IN VERIFYING THE SECURE GUEST~646

FIG. 6B

THE SPECIFIC DATA OF THE SECURE GUEST INCLUDES SESSION INFORMATION OF A SESSION USED BY THE REQUESTING ENTITY TO CONNECT TO THE SECURE GUEST TO SUBMIT TO THE SECURE GUEST AN ATTESTATION REQUEST STRUCTURE TO BE USED IN THE ATTESTATION REQUEST ~ 650

THE ATTESTATION REQUEST IS OBTAINED BY THE TRUSTED EXECUTION ENVIRONMENT VIA A NON-INTERCEPTABLE CALL FROM THE SECURE GUEST ~ 652

THE NON-INTERCEPTABLE CALL INCLUDES AN ATTESTATION REQUEST STRUCTURE THAT INCLUDES THE ATTESTATION KEY AND SPECIFIC DATA OF THE SECURE GUEST ~ 654

FIG. 6C

ATTESTATION OF A SECURE GUEST

BACKGROUND

One or more aspects relate, in general, to facilitating processing within a computing environment, and in particular, to improving such processing.

A computing environment may support virtualization, in which a hypervisor or virtual machine manager of the computing environment hosts various guests, such as virtual machines or virtual servers of the computing environment. A virtual machine has access to system resources and may execute an operating system, such as a guest operating system. Different guests can be owned by different owners, and of these guests, some can be secure guests.

A traditional hypervisor has full control over the hosted guests. In particular, the hypervisor has the capability to inspect and even modify memory of the hosted guest. However, a secure guest is a guest that can be hosted by hypervisors that are not fully trustworthy. The image of such a secure guest would be protected when loaded and the protection of the contents of the resources assigned to the guest (e.g., memory, CPU registers) would be maintained throughout the lifetime of the guest. The protection of the guest includes at least integrity protection (e.g., hypervisor cannot maliciously change any guest states) and in addition can include maintaining the confidentiality of the initial image, code and data running in the secure guest.

A user of a secure guest may wish to obtain certain information relating to the secure guest. Therefore, processing used to obtain such information is to be facilitated.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes obtaining, by a trusted execution environment, an attestation request. The attestation request includes at least an attestation key. Based on obtaining the attestation request, one or more integrity measurements are computed, and the computing uses at least the attestation key. The one or more integrity measurements are provided to an entity. The one or more integrity measurements are to be used to verify that a secure guest has been started using a selected secure guest image and selected secure guest metadata. This enables a requesting entity to ensure that the secure guest is a correct secure guest, thereby providing further security in a computing environment.

In one example, the attestation request includes an attestation request structure that is integrity protected, and the attestation key is maintained in an encrypted portion of the attestation request structure. This provides protection for the attestation request structure, the attestation key, and for processing associated therewith. The protection ensures that the request structure cannot be modified during the transmission from the requesting entity to the trusted execution environment and that the data in the encrypted portion of the request structure remains confidential during the transmission.

As an example, the attestation request structure is exclusively interpretable by the trusted execution environment. The integrity protection of the attestation request structure is verified and based on successful verification of the attestation request structure, the trusted execution environment decrypts the encrypted portion of the attestation request structure to obtain the attestation key to be used in computing the one or more integrity measurements. By verifying the integrity protection, security is maintained. If the verification is unsuccessful, processing of the attestation request fails.

In one example, the providing the one or more integrity measurements further includes providing select information of the trusted execution environment to be used to verify the secure guest. The select information includes, for instance, runtime data of the secure guest.

Further, in one example, the one or more integrity measurements includes a computed verification code computed based on at least an image of the secure guest and one or more secure guest metadata. As an example, the computed verification code is further computed based on runtime data of the secure guest. The runtime data of the secure guest includes, for instance, a unique identification of a running instance of the secure guest that issued the attestation request. By including data to identify a running secure guest instance in the returned integrity measurement, that data is also returned to the requesting entity. The requesting entity can then use that data to determine whether multiple (e.g., two) requests were processed by the trusted execution environment for the same secure guest instance.

In one example, the computed verification code is further computed based on specific data of the secure guest.

As one example, the attestation request is obtained from the secure guest via a non-interceptable call to the trusted execution environment. Further, in one example, the attestation request includes specific data of the secure guest. The specific data of the secure guest is to be used with the attestation key to compute the one or more integrity measurements.

Further, in one example, the entity is the secure guest and the providing further includes providing to the secure guest runtime data of the secure guest. In one example, the runtime data of the secure guest, the one or more integrity measurements and the specific data of the secure guest are to be further provided to a requesting entity to be used in verifying the secure guest.

As an example, the specific data of the secure guest includes session information of a session used by the requesting entity to connect to the secure guest to submit to the secure guest an attestation request structure to be used in the attestation request.

In one example, the attestation request is obtained by the trusted execution environment via a non-interceptable call from the secure guest. The non-interceptable call includes, for instance, an attestation request structure that includes the attestation key and specific data of the secure guest.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts one example of a description relating to an attestation request structure used in accordance with one or more aspects of the present invention;

FIGS. 6A-6C depict one example of facilitating processing within a computing environment, in accordance with one or more aspects of the present invention;

DETAILED DESCRIPTION

In accordance with one or more aspects of the present invention, a capability is provided to facilitate processing within a computing environment. As an example, the capability includes facilitating verification that a secure guest is a particular secure guest started using, for instance, a specific secure guest image and secure guest metadata. In one example, verification is provided for a session on a secure guest that cannot be perpetrated by, for instance, a man-in-the-middle system. In a further aspect, the capability includes facilitating a determination of whether multiple (e.g., two) instances of a secure guest are the same secure guest instance.

One embodiment of a computing environment to incorporate and use one or more aspects of the present invention is described with reference to FIG. 1. As an example, the computing environment is based on the z/Architecture® instruction set architecture, offered by International Business Machines Corporation, Armonk, N.Y. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Figure 1:
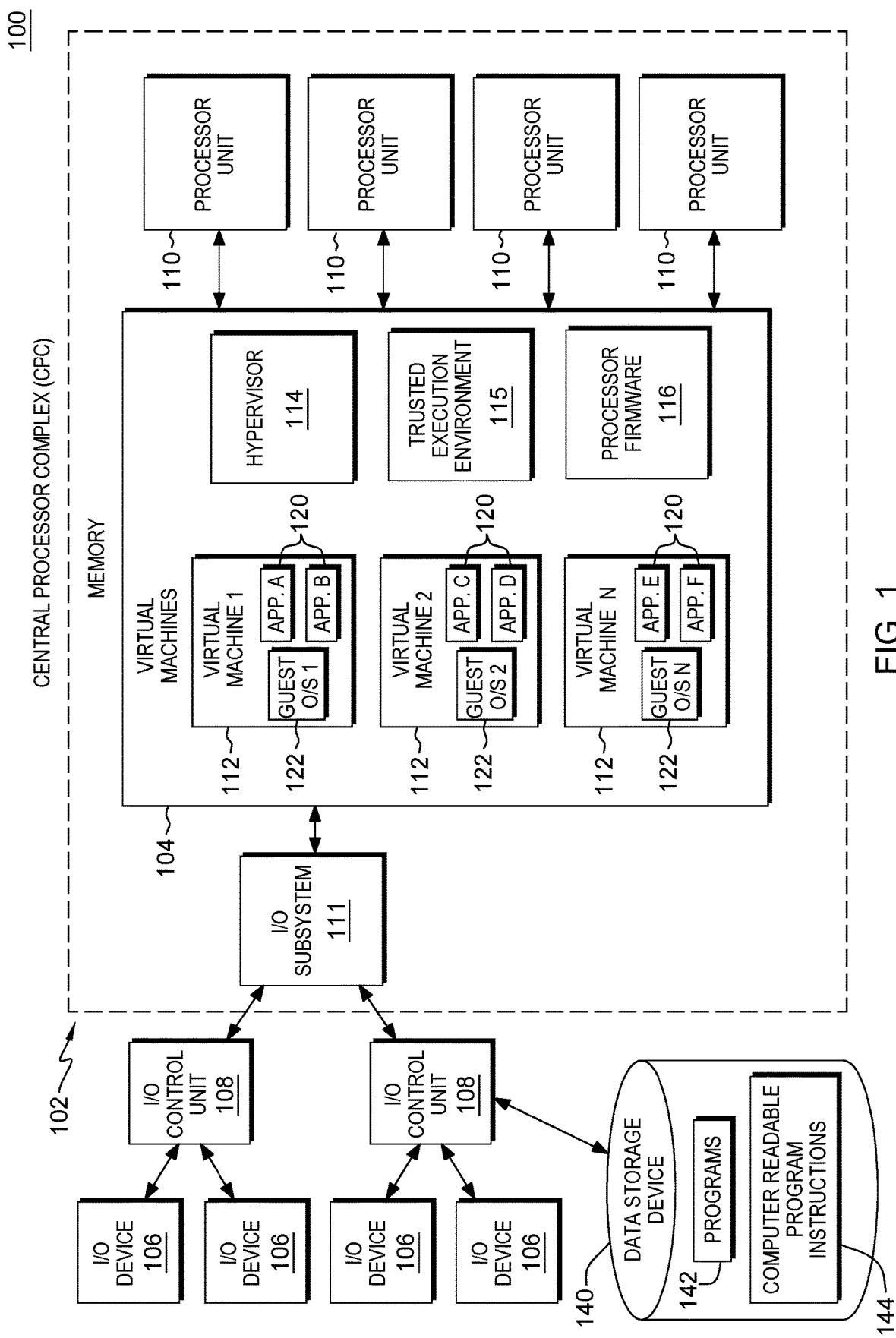
FIG. 1 depicts one example of a computing environment to incorporate and use one or more aspects of the present invention.

Referring to FIG. 1, in one example, a computing environment 100 includes a central processor complex (CPC) 102. Central processor complex 102 is, for instance, an IBM Z® server (or other server or machine offered by International Business Machines Corporation or other entities) and includes a plurality of components, such as, for instance, a memory 104 (a.k.a., system memory, main memory, main storage, central storage, storage) coupled to one or more processor units (also referred to as processors) 110 and to an input/output (I/O) subsystem 111. Example processor units 110 include one or more general-purpose processors (a.k.a., central processors or central processing units (CPUs)) and/or one or more other processors. IBM Z is a trademark or registered trademark of International Business Machines Corporation in at least one jurisdiction.

I/O subsystem 111 can be a part of the central processor complex or separate therefrom. It directs the flow of information between main storage 104 and input/output control units 108 and input/output (I/O) devices 106 coupled to the central processor complex.

Many types of I/O devices may be used. One particular type is a data storage device 140. Data storage device 140 can store one or more programs 142, one or more computer readable program instructions 144, and/or data, etc. The computer readable program instructions can be configured to carry out functions of embodiments of aspects of the invention.

Central processor complex 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode or millicode, device drivers, redundant processing units, external disk drive arrays, RAID systems, tape drives, and data archival storage systems, etc.

Further, central processor complex 102 can be operational with numerous other general-purpose or special-purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Central processor complex 102 provides, in one or more embodiments, virtualization support, in which memory 104 includes, for example, one or more virtual machines 112 (also referred to as guests), a virtual machine manager, such as a hypervisor 114, that manages the virtual machines, a trusted execution environment 115 (also referred to as an ultravisor) and processor firmware 116. One example of hypervisor 114 is the z/VM® hypervisor, offered by International Business Machines Corporation, Armonk, N.Y. The hypervisor is sometimes referred to as a host. z/VM is a trademark or registered trademark of International Business Machines Corporation in at least one jurisdiction.

In one or more embodiments, trusted execution environment 115 may be implemented, at least in part, in hardware and/or firmware configured to perform, for instance, processes such as described herein. The trusted execution environment is trusted firmware and/or hardware that makes use of memory-protection hardware to enforce memory protection. The owner of a guest can securely pass information (using, e.g., IBM Secure Execution) to the trusted execution environment by using a public host key, which is embedded in a host key document. To process the confidential information, the trusted execution environment uses a matching private host key. The private host key is specific to the server, e.g., the IBM Z® server, and is hardware protected.

Processor firmware 116 includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

The virtual machine support of the central processor complex provides the ability to operate large numbers of virtual machines 112, each capable of operating with different programs 120 and running a guest operating system 122, such as the Linux® operating system. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 2:
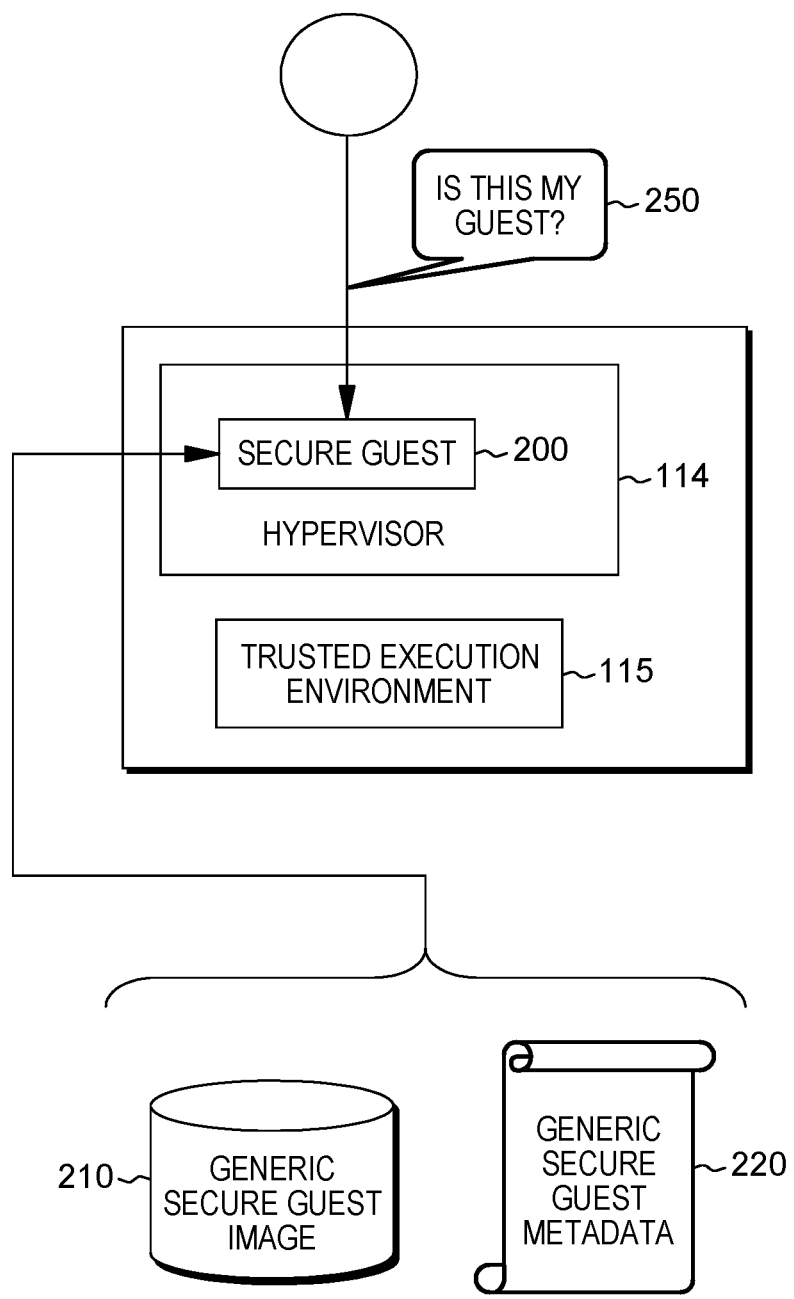
FIG. 2 depicts one example of an attestation inquiry, in accordance with one or more aspects of the present invention.

In one embodiment, one or more guests 112 are secure guests. Referring to FIG. 2, a secure guest 200 is started by a hypervisor (e.g., hypervisor 114) in a manner that the hypervisor cannot observe the state (e.g., memory, registers, etc.) of the secure guest. For instance, in one embodiment of confidential computing, the hypervisor can start/stop a secure guest, and the hypervisor knows where data used to start the secure guest is located but it cannot look into the running secure guest. Data used to load/start the secure guest may be encrypted in a manner that the hypervisor cannot see the secure guest. The owner of the secure guest image places confidential data in the secure guest metadata and then generates a secure guest image together with the secure guest metadata. After the secure guest is loaded, any interaction with the state of the secure guest is processed by a trusted execution environment, such as trusted execution environment 115.

In one embodiment, to start a secure guest, the hypervisor passes a secure guest image 210 that the hypervisor previously loaded into memory and secure guest metadata 220 to trusted execution environment 115. The metadata is integrity and at least partially confidentially protected and is only interpreted by the trusted execution environment. Based on the information in the secure guest metadata, the trusted execution environment can then enforce the integrity of the secure guest image loaded into memory, protect the memory of the secure guest containing the loaded image from being accessible by the hypervisor, and potentially decrypt the secure guest image before starting the secure guest.

Subsequent to loading or starting the secure guest, it may be desirable to verify that the secure guest is a particular secure guest that has, for instance, been started using a particular secure guest image and metadata. Therefore, in accordance with one or more aspects of the present invention, an inquiry is made as to whether this is a particular secure guest 250. As an example, this inquiry is made by a requesting entity, such as a user or owner of the secure guest. To provide an answer to such an inquiry, information is collected and one or more measurements (e.g., a hash, a message authentication code, a cryptographic signature, etc.) are computed and used to determine (e.g., by the requesting entity external to the secure guest) whether a secure guest is a particular secure guest. In one example, to compute the one or more measurements, an attestation request structure is used. The attestation request structure is prepared external to the secure guest by, e.g., a user or owner of the secure guest.

One example of a description relating to an attestation request structure is described with reference to FIG. 3. As shown in FIG. 3, in one example, a description 300 relating to an attestation request structure (also referred to herein as attestation request structure description 300) includes a plurality of entries 302, and each entry 302 has a name 310, an abbreviation (abbr) 312 and a short description of the entry (contents) 314, as well as a protection indication (protection) 316 of whether the contents (e.g., contents 314) are integrity protected or both integrity and confidentially protected (e.g., encrypted) by, e.g., a request protection key that can, e.g., only be obtained by a target system. In one example, contents 314 include the data/attributes of a request structure, and name 310, abbreviation 312 and protection indication 316 provide information relating to contents 314.

As examples, one entry 318 of the attestation request structure includes a customer public key (provided by the requesting entity) and one or more other entries 320 include key slots 1-N, each including a request protection key protected by a host key of a target host/trusted execution environment. The customer public key and the key slots are used to securely communicate to the trusted execution environment a request protection key (using, e.g., an (elliptic curve) Diffie-Hellman technique) of a set of possible target systems, in which each key slot addresses one target system. As a further example, another entry 322 of the attestation request structure description includes an attestation key, abbreviated AK (see abbreviation 312), which is, for instance, a 512-bit hash-based message authentication code (HMAC) key (see contents 314), which is encrypted, as indicated by protection indication 316. An additional entry 324 of the attestation request structure includes a request structure tag that contains data that can be used to verify the integrity of the request structure. Additional, less and/or other information may be included in attestation request structure description 300. Attestation request structure description 300 may include additional, fewer and/or other entries, and/or each entry may have additional, fewer and/or other information. Further, an attestation request structure (e.g., contents 314) may include additional, fewer and/or other data/attributes. Many possibilities exist.

An attestation request structure is used, in accordance with one or more aspects of the present invention, to verify or attest that the secure guest is a particular secure guest. One example of this processing is described with reference to FIGS. 4A-4B.

Figure 4A:
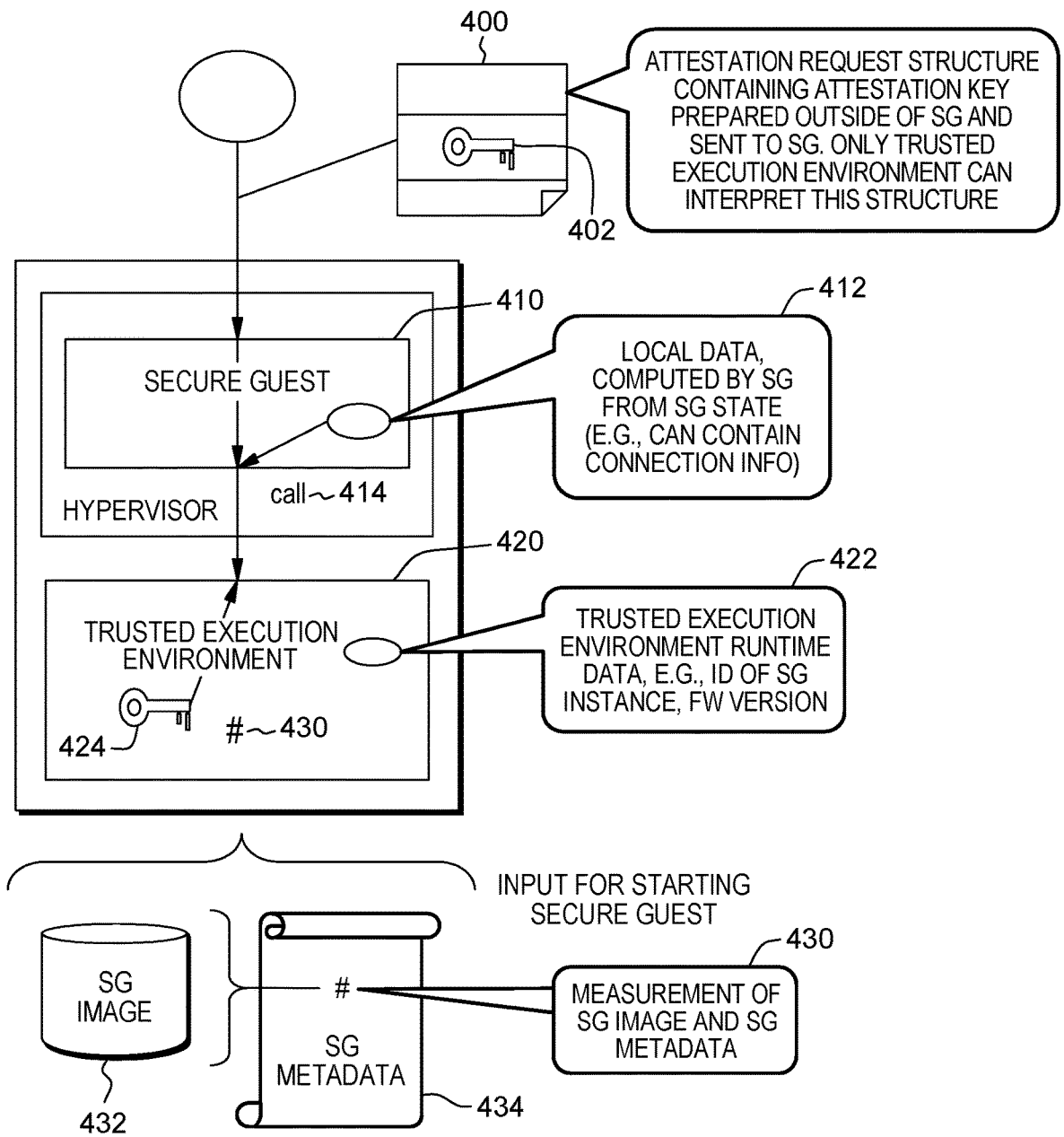
FIGS. 4A-4B depict one example of processing an attestation request, in accordance with one or more aspects of the present invention.

Referring initially to FIG. 4A, in one example, an attestation request structure 400 (e.g., having contents similar to contents 314), that was prepared outside of the secure guest and includes, e.g., an attestation key 402, is obtained (e.g., sent, provided, received, pulled, etc.) by secure guest 410. Secure guest 410 computes local data 412 (e.g., connection information and/or other information) from, e.g., secure guest state. For instance, the local data is specific to the secure guest and includes, e.g., session information to be used by a requesting entity (e.g., requesting verification) to connect to a secure guest when, e.g., submitting to the secure guest the attestation structure.

Further, secure guest 410 performs a call 414 to a trusted execution environment 420. The call includes, for instance, the attestation request structure and the local data. The trusted execution environment obtains (e.g., receives, is provided, pulls, etc.) the call with the arguments, including the attestation request structure. Using a system specific private key (a.k.a., a host key) 424, the trusted execution environment checks the integrity of the attestation request structure. For example, the request protection key is extracted from one of the key slots, described herein, and that key is used to perform the integrity check of the request. Based on successful verification, the trusted execution environment continues to execute the attestation request, including initially extracting attestation key 402 included in the request structure.

The trusted execution environment determines runtime data of the trusted execution environment 422, such as an identifier of the secure guest instance (e.g., a unique identification of a running instance of the secure guest that issued the attestation request) and a firmware version, as examples. Trusted execution environment 420 further obtains one or more measurements (e.g., a hash, a message authentication code, a cryptographic signature, etc.) 430 of a secure guest image 432 and secure guest metadata 434.

Figure 4B:
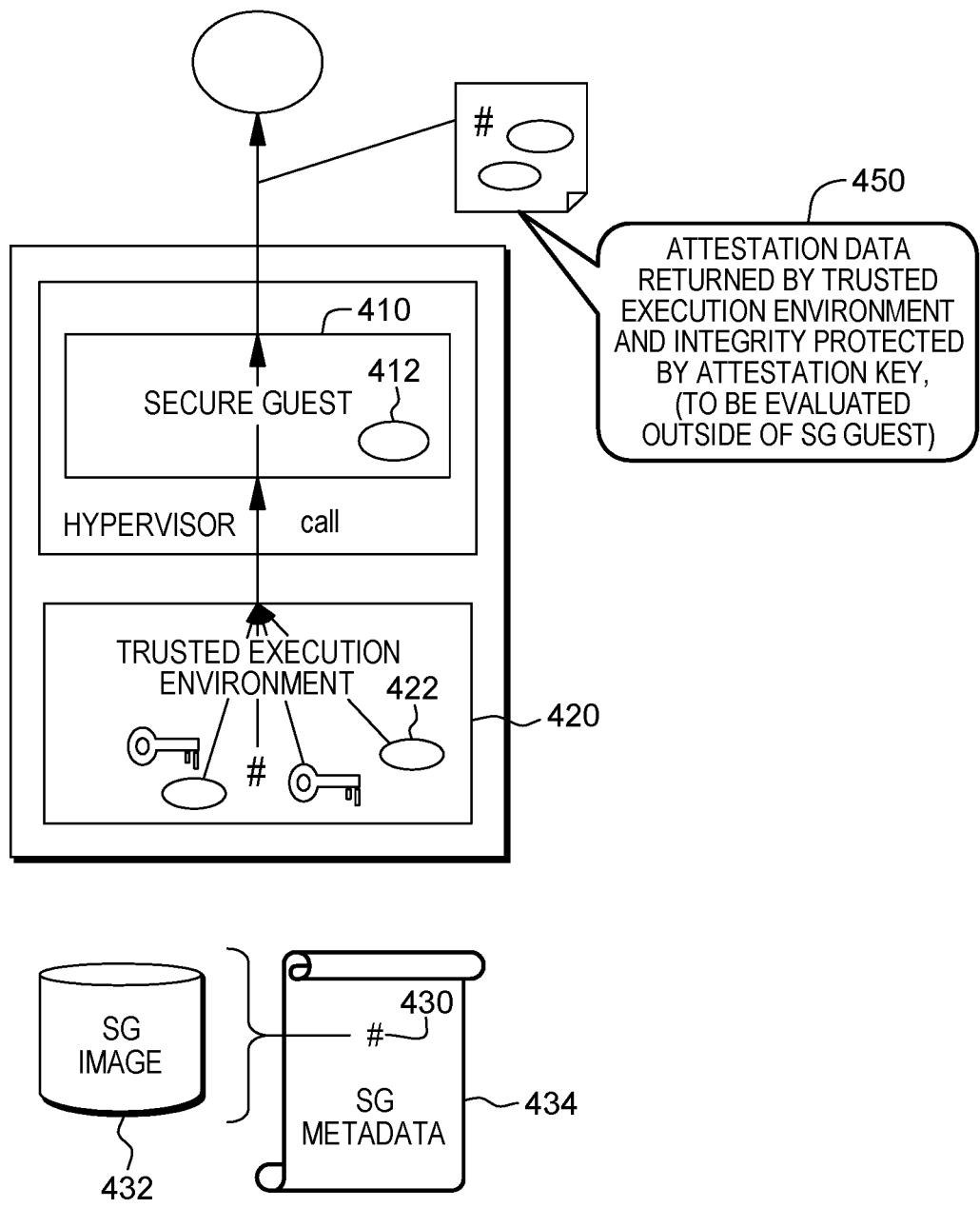

Based on receiving the call, referring to FIG. 4B, trusted execution environment 420 determines attestation data, e.g., a verification tag, such as a message authentication code tag, for one or more measurements 430, local data 412 and runtime data 422 of the trusted execution environment using attestation key 402. This attestation data together with runtime data 422 of the trusted execution environment is returned to secure guest 410. The secure guest then returns the attestation data (e.g., attestation data 450), runtime data 422 of the trusted execution environment and local data 412 to the requesting entity (e.g., user or owner of secure guest, other entity) external to the secure guest. Attestation data 450 is, for instance, integrity protected by the attestation key, and is to be evaluated by, for instance, the requesting entity external to the secure guest.

Figure 5:
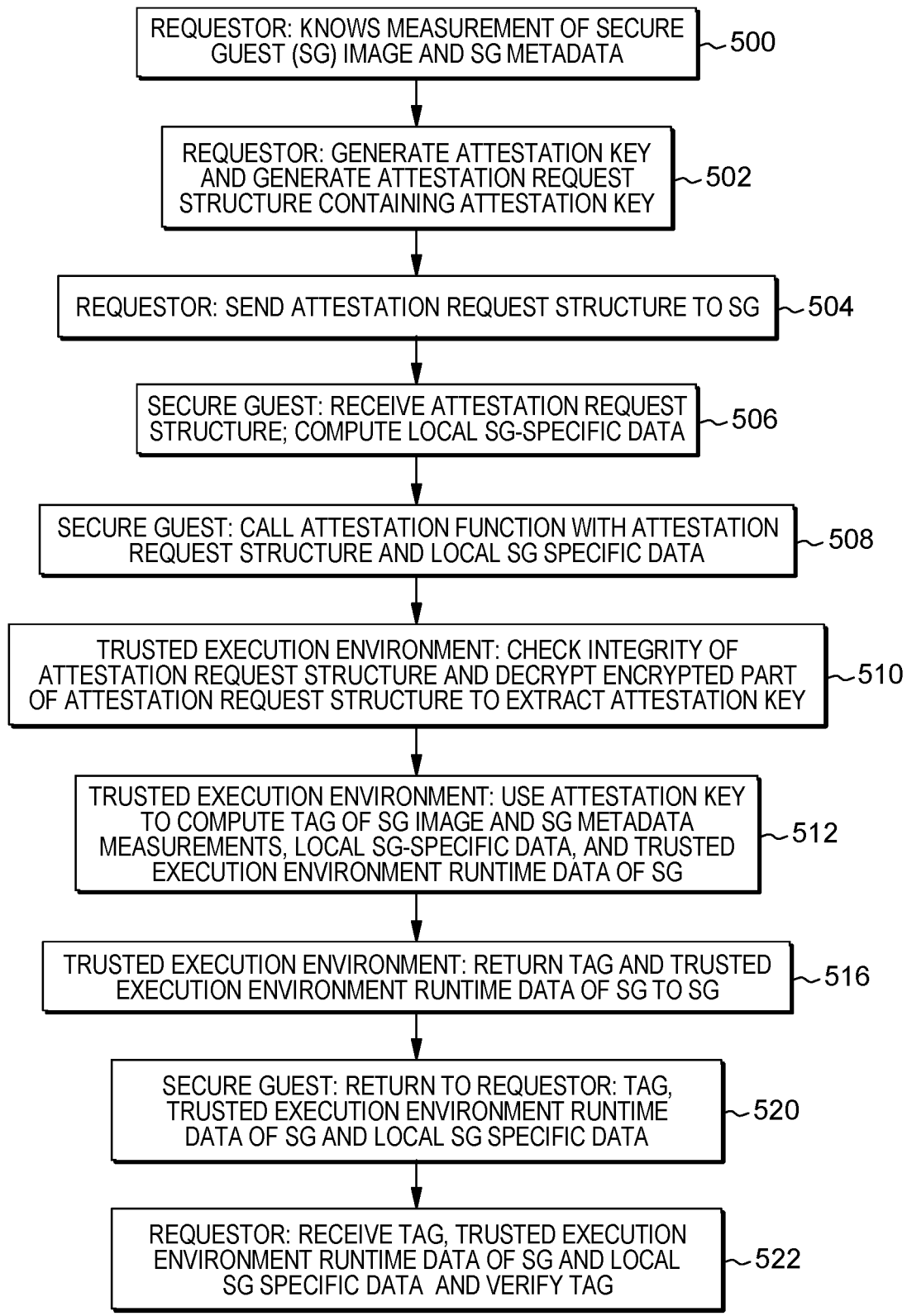
FIG. 5 depicts one example of an attestation process, in accordance with one or more aspects of the present invention.

Further details of one embodiment of an attestation process to be used to verify that a secure guest is a particular secure guest having specific secure guest metadata are described with reference to FIG. 5.

In one embodiment, a requesting entity (also referred to herein as requestor), such as a secure guest owner, user or other entity, has knowledge of one or more measurements (e.g., a hash, a message authentication code, a cryptographic signature, etc.) of a secure guest image and of secure guest metadata 500. The requesting entity generates, for instance, an attestation key and includes the attestation key in an attestation request structure 502. The attestation request structure may be generated by the requesting entity, another entity or be pre-existing. It includes the attestation key and optionally, other information, as described herein. The requesting entity sends the attestation request to a secure guest having a defined relationship with (e.g., owned by) the requesting entity 504.

The secure guest receives the attestation request including, e.g., the attestation request structure, and determines local data specific to the secure guest 506. For instance, the local data includes, e.g., session information of the session used by a requesting entity (e.g., requesting verification) to connect to a secure guest when, e.g., submitting to the secure guest the attestation structure. Further, the secure guest calls a trusted execution environment function with the attestation request structure and the local secure guest-specific data as arguments to the call 508.

The trusted execution environment receives the call including the attestation request structure and the local data and checks the integrity of the attestation request structure 510. For instance, the trusted execution environment determines a measurement (e.g., a hash, a message authentication code, a cryptographic signature, etc.) for the attestation request structure and compares it to a corresponding known value. If it has a predefined relationship (e.g., equal) to the known value, the integrity of the attestation request structure is verified. A request protection key used to protect the measurements (e.g., message authentication code, signature) can be included in the attestation request structure protected by a system specific private key (a.k.a., host key) which is available to the trusted execution environment.

Based on successfully verifying the integrity of the attestation request structure, the trusted execution environment decrypts an encrypted part of the attestation request structure (e.g., using the request protection key) to extract the attestation key from the encrypted part. The trusted execution environment uses the attestation key to compute at least one integrity measure, such as verification tag (also referred to as tag; e.g., message authentication code tag), representing a combination of the secure guest image, one or more secure guest metadata measurements, local data for the secure guest and trusted execution environment runtime data of the secure guest 512. The computation of the integrity measure may use one or more techniques now known or later developed. The trusted execution environment returns the computed integrity measure (e.g., verification tag) and trusted execution environment runtime data of the secure guest (e.g., a unique identification of a running instance of the secure guest that issued the attestation request) to the secure guest 516.

The secure guest returns the computed integrity measure (e.g., verification tag, such as a message authentication code tag), trusted execution environment runtime data of the secure guest and local data of the secure guest (e.g., session information) to the requesting entity 520.

The requesting entity receives the returned data 522, which may be used to determine whether the secure guest is a particular secure guest. For instance, the secure guest owner compares the obtained verification tag (e.g., computed in 512 and returned in 516, 520) with a known value (e.g., pre-existing or computed) and if they have a predefined relationship (e.g., equal), it is verified that the secure guest is a particular secure guest having particular secure guest metadata.

As described herein, an attestation trusted execution environment call is provided that is callable, e.g., only from a secure guest. The call takes, e.g., an attestation request structure (or at least an attestation key) and select local data (e.g., session information) as arguments, and returns, e.g., trusted execution environment specific runtime data (e.g., unique id of a running instance of the secure guest that issued the attestation request) and a verification tag (e.g., a message authentication code or other measure) of one or more secure guest measurements, local data and specific trusted execution environment runtime data computed using an attestation key, such as, e.g., a message authentication code key.

A valid secure guest calls a function with a received attestation request structure prepared by a requesting entity and with local data (e.g., data specific to, e.g., session used to receive the request, e.g., client certificates of an SSH (secure shell) or TLS (transport layer security) session opened by the user. A trusted execution environment receives the call, determines a result (e.g., a verification tag) and returns the result to the secure guest. The secure guest will pass the result of the attestation function to the requesting entity who can then verify the result as identifying both the secure guest and the session used to log into the secure guest.

In one or more aspects, an attestation request structure is defined, in which the request structure is protected by, e.g., a request protection key. The request protection key is securely communicated to the trusted execution environment using the trusted execution environment's private key (a.k.a., host key). Optionally, the request structure contains a public key of the customer if a select technique (e.g., Elliptic-Curve Diffie-Hellman) is used to communicate the request protection key. Part of the request is confidentially protected (encrypted) using the request protection key; that part contains, e.g., an attestation key (e.g., a message authentication code key) and an optional nonce. In one example, the request structure includes an indication of which measure(s) shall be attested.

In a further aspect, an attestation function is added to the trusted execution environment callable from a secure guest. The attestation function takes, for instance, an attestation request structure as an argument. Optionally, the attestation function takes a second argument for local secure guest-specific data. The function returns, for instance, one or more measurements of the secure guest image, the metadata of the secure guest image, any additional data defined by the request, and optionally the local data from the second argument to the function, all being linked together via, e.g., a message authentication code, using the attestation key.

In a further aspect, to defend against a man-in-the-middle system, a service is provided in a valid secure guest to provide a remote attestation function. The service takes, e.g., a request structure received within a session as an argument. The service derives data specific to the connection/session to issue the request (that session specific data can be derived from the certificate of the client who opened the connection/session, a session number, etc.). The service calls the attestation trusted execution environment call with the request structure as one argument and the certificate as another argument.

In one aspect, optionally, data that can selected in the request structure to be included in the measurements include, for instance, the public key belonging to the private key the trusted execution environment used to unpack the secure guest metadata when starting the secure guest, a firmware release, and/or a secure guest ID, as examples.

A valid secure guest with use of the function may receive the request structure prepared by the requesting entity or other entity and may use data specific to the session used to receive the request as local data, e.g., client certificates of a secure shell or transport layer security session opened by the user. The valid secure guest will pass the result of the attestation function to the requesting entity who can then verify the result as identifying both the secure guest and the session used to log into the secure guest.

One or more aspects of the present invention are inextricably tied to computer technology and facilitate processing within a computer, improving performance thereof. Processing is facilitated by being able to validate a secure guest and provide protections for the computing environment.

Further details of one embodiment of facilitating processing within a computing environment, as it relates to one or more aspects of the present invention, are described with reference to FIGS. 6A-6C.

Referring to FIG. 6A, in one embodiment, a trusted execution environment obtains an attestation request 600. The attestation request includes at least an attestation key 602. Based on obtaining the attestation request, one or more integrity measurements are computed, and the computing uses at least the attestation key 604. The one or more integrity measurements are provided to an entity 606, and the one or more integrity measurements are to be used to verify that a secure guest has been started using a selected secure guest image and selected secure guest metadata 608. This enables a requesting entity to ensure that the secure guest is a correct secure guest, thereby providing further security in a computing environment.

In one example, the attestation request includes an attestation request structure 610 that is integrity protected, and the attestation key is maintained in an encrypted portion of the attestation request structure 612. This provides protection for the attestation request structure, the attestation key, and for processing associated therewith.

As an example, the attestation request structure is exclusively interpretable by the trusted execution environment 614. The integrity protection of the attestation request structure is verified 615 and based on successful verification of the attestation request structure, the trusted execution environment decrypts the encrypted portion of the attestation request structure to obtain the attestation key to be used in computing the one or more integrity measurements 616. By verifying the integrity protection, security is maintained. If the verification is unsuccessful, processing of the attestation request fails.

In one example, the providing the one or more integrity measurements further includes providing select information of the trusted execution environment to be used to verify the secure guest 618. The select information includes, for instance, runtime data of the secure guest 620.

Further, in one example, and referring to FIG. 6B, the one or more integrity measurements includes a computed verification code computed based on at least an image of the secure guest and one or more secure guest metadata 630. As an example, the computed verification code is further computed based on runtime data of the secure guest 632. The runtime data of the secure guest includes, for instance, a unique identification of a running instance of the secure guest that issued the attestation request 634. By including data to identify a running secure guest instance in the returned integrity measurement, that data is also returned to the requesting entity. The requesting entity can then use that data to determine whether multiple (e.g., two) requests were processed by the trusted execution environment for the same secure guest instance.

In one example, the computed verification code is further computed based on specific data of the secure guest 636.

As one example, the attestation request is obtained from the secure guest via a non-interceptable call to the trusted execution environment 638. Further, in one example, the attestation request includes specific data of the secure guest 640. The specific data of the secure guest is to be used with the attestation key to determine the one or more integrity measurements 642.

Further, in one example, the entity is the secure guest and the providing further includes providing to the secure guest runtime data of the secure guest 644. In one example, the runtime data of the secure guest, the one or more integrity measurements and the specific data of the secure guest are to be further provided to a requesting entity to be used in verifying the secure guest 646.

As an example, referring to FIG. 6C, the specific data of the secure guest includes session information of a session used by the requesting entity to connect to the secure guest to submit to the secure guest an attestation request structure to be used in the attestation request 650.

In one example, the attestation request is obtained by the trusted execution environment via a non-interceptable call from the secure guest 652. The non-interceptable call includes, for instance, an attestation request structure that includes the attestation key and specific data of the secure guest 654.

Other variations and embodiments are possible.

Figure 7A:
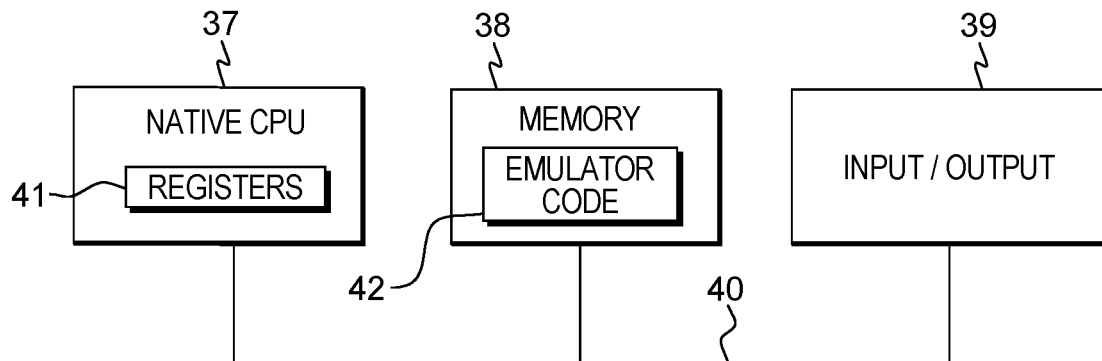
FIG. 7A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 7A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 7B:
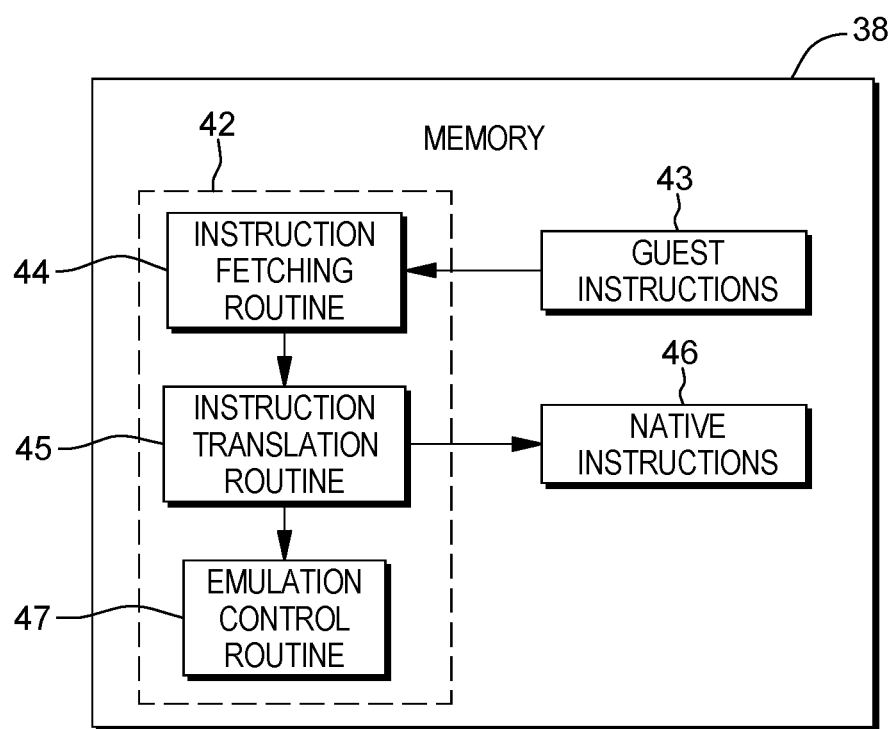
FIG. 7B depicts further details of the memory of FIG. 7A, in accordance with one or more aspects of the present invention.

Further details relating to emulator code 42 are described with reference to FIG. 7B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction, command or call that may be emulated includes the trusted execution environment call described herein, in accordance with one or more aspects of the present invention. Further, other instructions, commands, functions, operations, calls and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
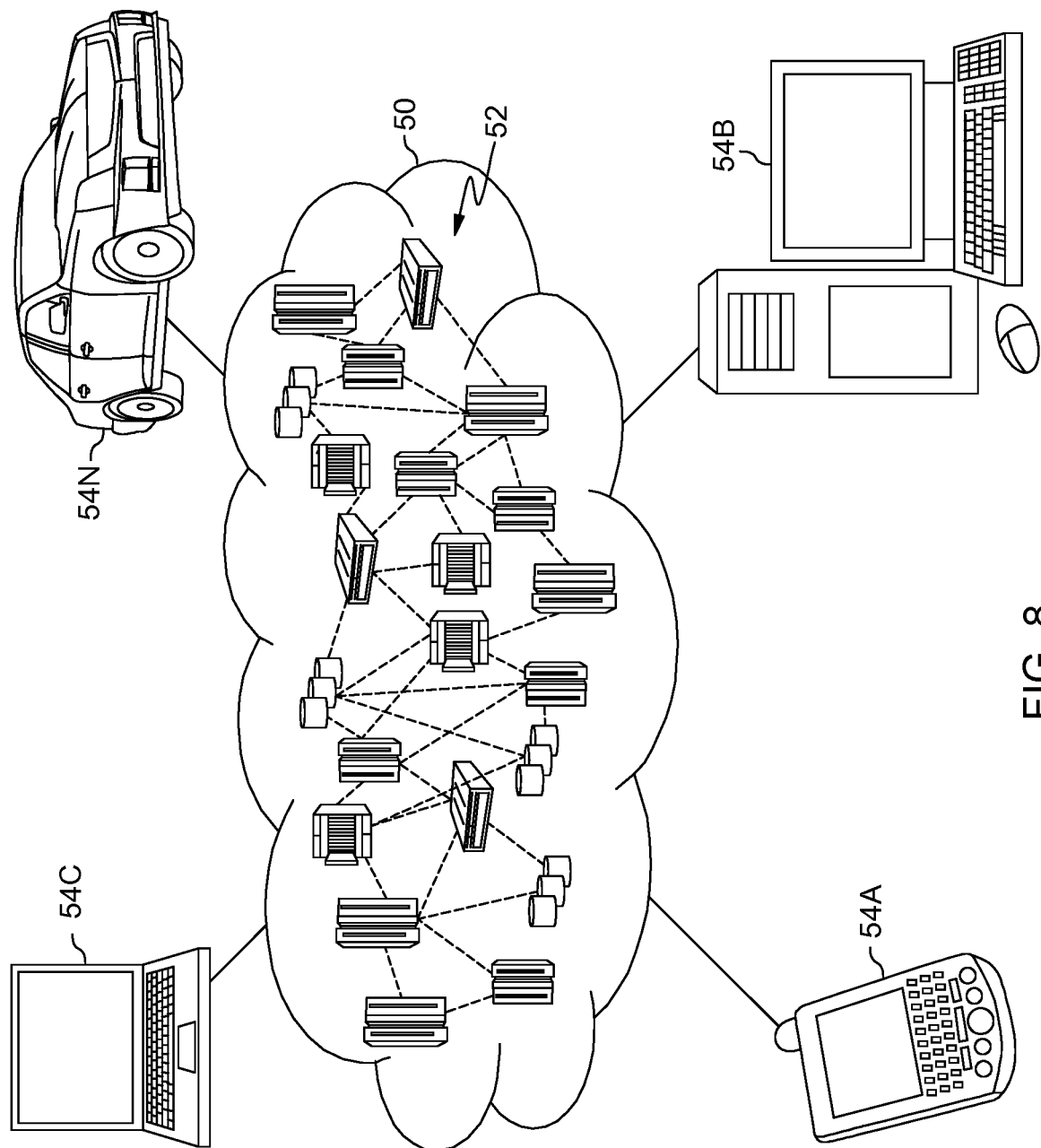
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
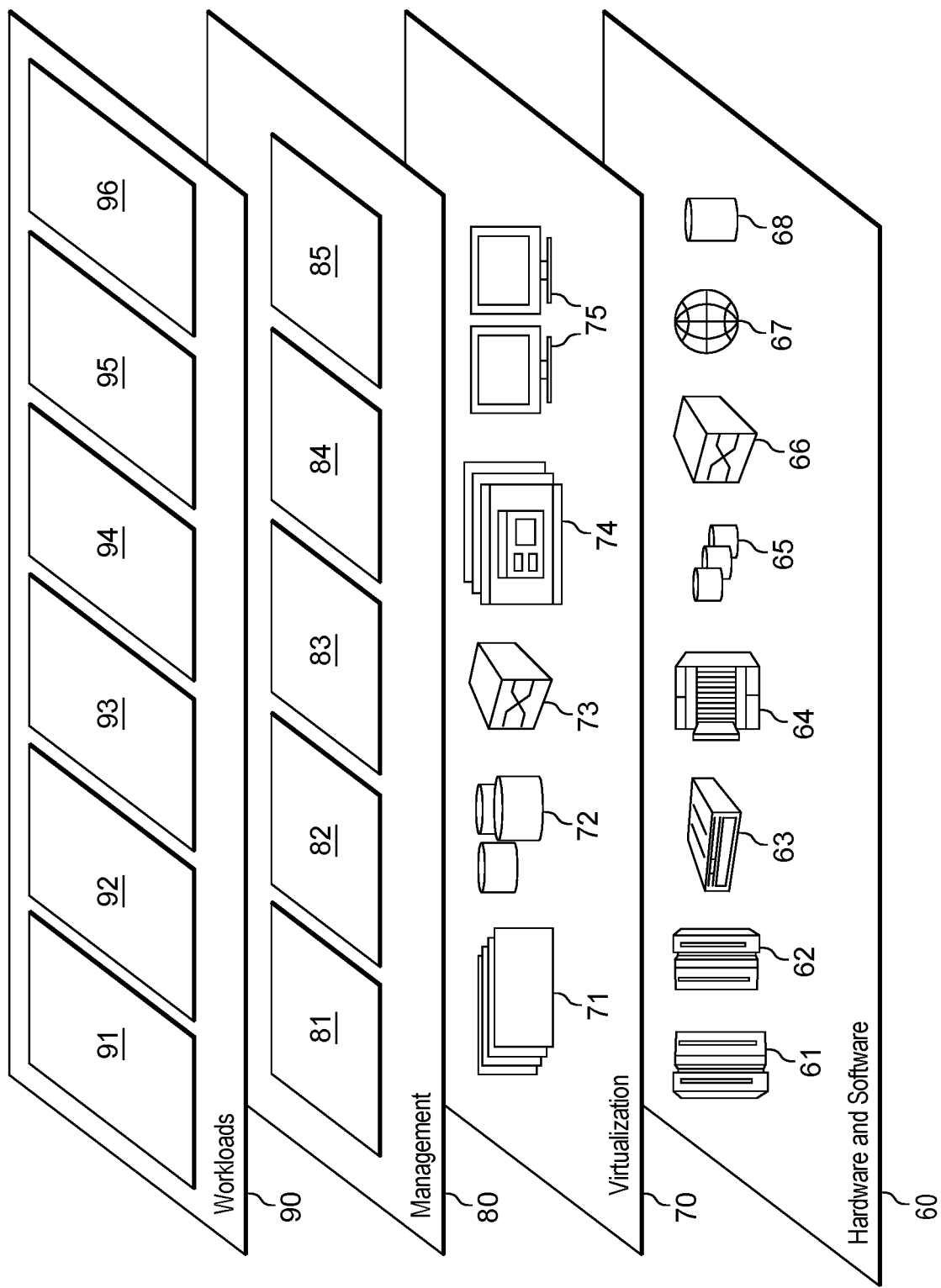
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and attestation for a secure guest processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, commands, functions, calls and/or operations may be used. Additionally, different types of structures may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
  one or more computer readable storage media and program instructions collectively stored on the one or more computer readable storage media to perform a method comprising:
    obtaining, by a trusted execution environment, an attestation request to be used to verify that a secure guest that is running is a particular secure guest, the attestation request including select local data specific to the secure guest and an attestation request structure including one or more entries, wherein an entry of the one or more entries includes an attestation key, and wherein the select local data specific to the secure guest includes session information of a session to be used to connect to the secure guest to submit to the secure guest the attestation request structure to be used in the attestation request;
    computing, based on obtaining the attestation request, one or more integrity measurements, the computing using at least the attestation key to compute the one or more integrity measurements representing, at least, the select local data specific to the secure guest; and providing the one or more integrity measurements to an entity, the one or more integrity measurements to be used to verify that the secure guest is a correct secure guest that has been started using a particular secure guest image and selected secure guest metadata particular to the secure guest.

2. The computer program product of claim 1, wherein the attestation request structure is integrity protected, the entry includes a protection indication for the attestation key, and wherein the attestation key is maintained in an encrypted portion of the attestation request structure.

3. The computer program product of claim 2, wherein the attestation request structure is exclusively interpretable by the trusted execution environment, and wherein the method further comprises:

verifying integrity protection of the attestation request structure; and decrypting, by the trusted execution environment based on successfully verifying the integrity protection of the attestation request structure, the encrypted portion of the attestation request structure to obtain the attestation key to be used in computing the one or more integrity measurements.

4. The computer program product of claim 1, wherein the providing the one or more integrity measurements further comprises providing select information of the trusted execution environment to be used to verify the secure guest, the select information including runtime data of the secure guest.

5. The computer program product of claim 1, wherein the one or more integrity measurements includes a computed verification code computed based on at least an image of the secure guest and one or more secure guest metadata.

6. The computer program product of claim 5, wherein the computed verification code is further computed based on runtime data of the secure guest.

7. The computer program product of claim 6, wherein the runtime data of the secure guest comprises a unique identification of a running instance of the secure guest that issued the attestation request.

8. The computer program product of claim 6, wherein the computed verification code is further computed based on the select local data specific to the secure guest.

9. The computer program product of claim 1, wherein the attestation request is obtained from the secure guest via a non-interceptable call to the trusted execution environment, and wherein the entity is the secure guest and the providing further includes providing to the secure guest runtime data of the secure guest, wherein the runtime data of the secure guest, the one or more integrity measurements and the select local data specific to the secure guest are to be further provided to a requesting entity to be used in verifying the secure guest.

10. The computer program product of claim 9, wherein the select local data specific to the secure guest includes the session information of the session used by the requesting entity to connect to the secure guest to submit to the secure guest the attestation request structure to be used in the attestation request.

11. The computer program product of claim 1, wherein the attestation request is obtained by the trusted execution environment via a non-interceptable call from the secure guest, the non-interceptable call including the attestation request structure that includes the attestation key.

12. A computer system for facilitating processing within a computing environment, the computer system comprising:

a memory; and at least one processor in communication with the memory, wherein the computer system is configured to perform a method, said method comprising:

obtaining, by a trusted execution environment, an attestation request to be used to verify that a secure guest that is running is a particular secure guest, the attestation request including select local data specific to the secure guest and an attestation request structure including one or more entries, wherein an entry of the one or more entries includes an attestation key, and wherein the select local data specific to the secure guest includes session information of a session to be used to connect to the secure guest to submit to the secure guest the attestation request structure to be used in the attestation request;

computing, based on obtaining the attestation request, one or more integrity measurements, the computing using at least the attestation key to compute the one or more integrity measurements representing, at least, the select local data specific to the secure guest; and providing the one or more integrity measurements to an entity, the one or more integrity measurements to be used to verify that the secure guest is a correct secure guest that has been started using a particular secure guest image and selected secure guest metadata particular to the secure guest.

13. The computer system of claim 12, wherein the attestation request structure is integrity protected, the entry includes a protection indication for the attestation key, and wherein the attestation key is maintained in an encrypted portion of the attestation request structure.

14. The computer system of claim 12, wherein the providing the one or more integrity measurements further comprises providing select information of the trusted execution environment to be used to verify the secure guest, the select information including runtime data of the secure guest.

15. The computer system of claim 14, wherein the runtime data of the secure guest comprises a unique identification of a running instance of the secure guest that issued the attestation request.

16. The computer system of claim 12, wherein the attestation request is obtained from the secure guest via a non-interceptable call to the trusted execution environment, and wherein the entity is the secure guest and the providing further includes providing to the secure guest runtime data of the secure guest, wherein the runtime data of the secure guest, the one or more integrity measurements and the select local data specific to the secure guest are to be further provided to a requesting entity to be used in verifying the secure guest.

17. A computer-implemented method of facilitating processing within a computing environment, the computer-implemented method comprising:

obtaining, by a trusted execution environment of a hardware processor, an attestation request to be used to verify that a secure guest that is running is a particular secure guest, the attestation request including select local data specific to the secure guest and an attestation request structure including one or more entries, wherein an entry of the one or more entries includes an attestation key, and wherein the select local data specific to the secure guest includes session information of a session to be used to connect to the secure guest to submit to the secure guest the attestation request structure to be used in the attestation request;

computing, based on obtaining the attestation request, one or more integrity measurements, the computing using at least the attestation key to compute the one or more integrity measurements representing, at least, the select local data specific to the secure guest; and providing the one or more integrity measurements to an entity, the one or more integrity measurements to be used to verify that the secure guest is a correct secure guest that has been started using a particular secure guest image and selected secure guest metadata particular to the secure guest.

18. The computer-implemented method of claim 17, wherein the attestation request structure is integrity protected, the entry includes a protection indication for the attestation key, and wherein the attestation key is maintained in an encrypted portion of the attestation request structure.

19. The computer-implemented method of claim 17, wherein the providing the one or more integrity measurements further comprises providing select information of the trusted execution environment to be used to verify the secure guest, the select information including runtime data of the secure guest.

20. The computer-implemented method of claim 17, wherein the attestation request is obtained from the secure guest via a non-interceptable call to the trusted execution environment, and wherein the entity is the secure guest and the providing further includes providing to the secure guest runtime data of the secure guest, wherein the runtime data of the secure guest, the one or more integrity measurements and the local data specific to the secure guest are to be further provided to a requesting entity to be used in verifying the secure guest.

21. The computer-implemented method of claim 17, wherein the attestation request structure includes a plurality of entries, and wherein multiple entries of the plurality of entries include contents and protection indications of the contents.

22. The computer program product of claim 4, wherein the runtime data of the secure guest comprises a unique identification of a running instance of the secure guest that issued the attestation request.

23. The computer program product of claim 1, wherein the attestation request structure includes a plurality of entries, and wherein multiple entries of the plurality of entries include contents and protection indications of the contents.

24. The computer program product of claim 1, wherein the one or more integrity measurements represent, at least, a combination of an image of the secure guest and the select local data specific to the secure guest.

25. A computer program product for facilitating processing within a computing environment, the computer program product comprising:

one or more computer readable storage media and program instructions collectively stored on the one or more computer readable storage media to perform a method comprising:

obtaining, by a trusted execution environment, an attestation request to be used to verify that a secure guest that is running is a particular secure guest, the attestation request including select local data specific to the secure guest and an attestation request structure including one or more entries, wherein an entry of the one or more entries includes an attestation key, and wherein the select local data specific to the secure guest includes session information of a session to be used to connect to the secure guest;

verifying integrity protection of the attestation request structure;

decrypting, by the trusted execution environment based on successfully verifying the integrity protection of the attestation request structure, an encrypted portion of the attestation request structure to obtain the attestation key to be used in computing one or more integrity measurements;

computing, based on obtaining the attestation request, the one or more integrity measurements, the computing using at least the attestation key to compute the one or more integrity measurements representing, at least, the select local data specific to the secure guest; and providing the one or more integrity measurements to an entity, the one or more integrity measurements to be used to verify that the secure guest is a correct secure guest that has been started using a particular secure guest image and selected secure guest metadata particular to the secure guest.

* * * * *